Dec. 29, 1942.   G. M. GROENENDYKE   2,306,991
AUTOMATIC VOLUME CONTROL
Filed March 23, 1939   2 Sheets-Sheet 2
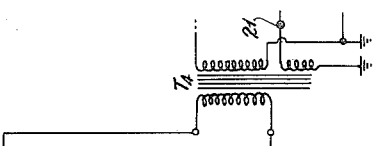
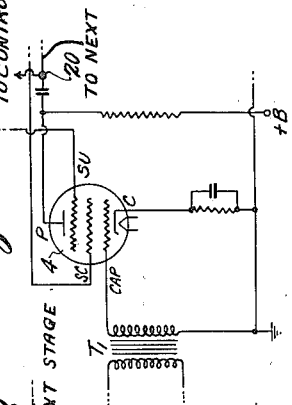
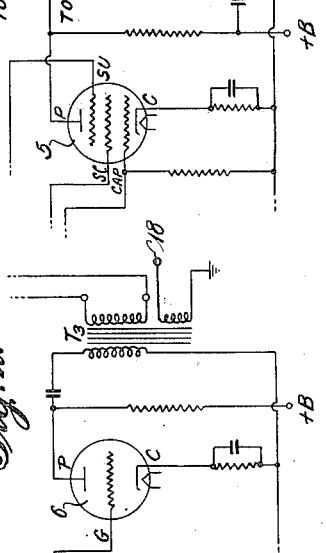
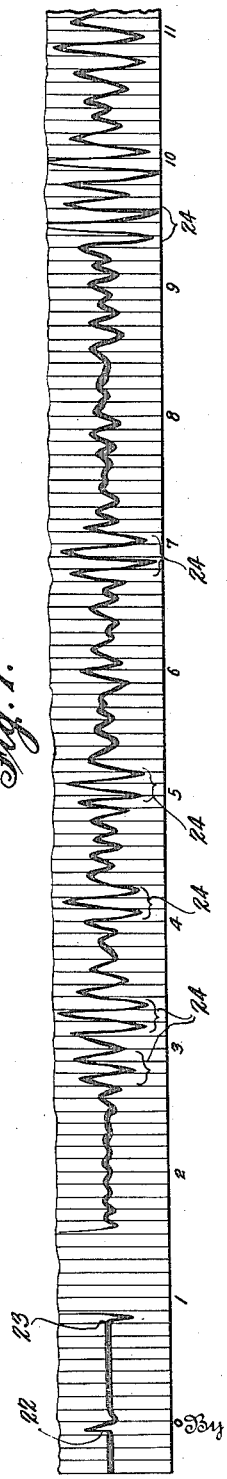
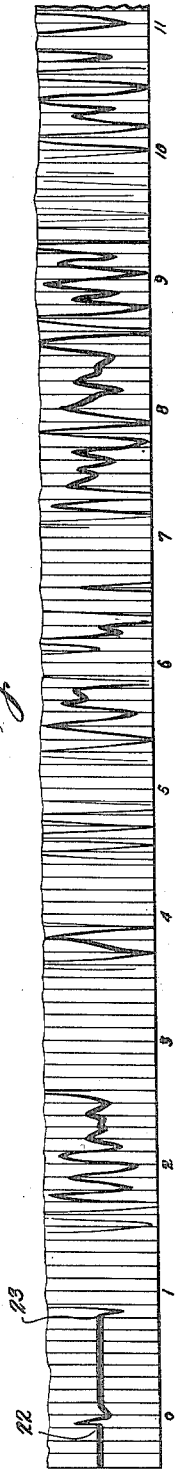
Inventor
Goethe M. Groenendyke
Attorney Patented Dec. 29, 1942

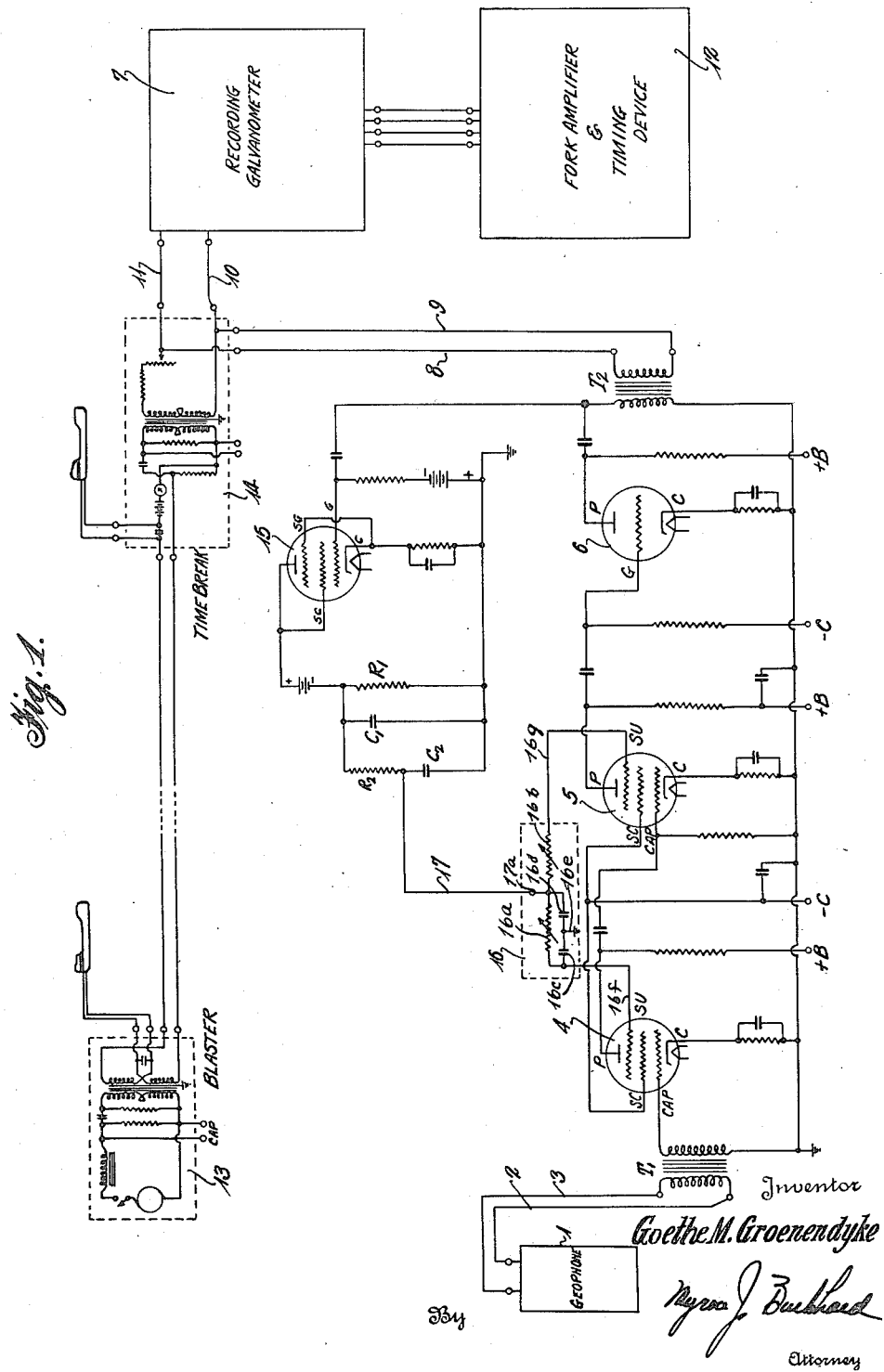

2,306,991

UNITED STATES PATENT OFFICE 2,306,991

AUTOMATIC VOLUME CONTROL

Goethe M. Groenendyke, Dallas, Tex., assignor, by mesne assignments, to Socony-Vacuum Oil Company, Incorporated, New York, N. Y., a corporation of New York Application March 23, 1939, Serial No. 263,740

2 Claims. (Cl. 177—352)

This invention relates generally to a method and apparatus for surveying the subsurface strata of the earth by the use of artificially created seismic waves, and more particularly to the method and apparatus for recording all the data on a single spread when shot in one direction by detonating a single charge of explosive.

In the art of exploring subsurface strata by the use of artificially created seismic waves, it is customary to detonate a charge of explosives at a point on or near the earth's surface and record the seismic waves generated by the detonation of the explosives at predetermined points removed from the point of generation. From the data thus recorded it is possible to ascertain the depth of subsurface horizons, from which the seismic waves that are recorded have been reflected. The depths of these subsurface horizons are computed from the velocity at which the seismic waves travel down to the reflecting horizon and return to the detecting instrument. This velocity will vary, dependent upon the density and elastic coefficients of the materials through which it travels. In addition to considering the velocity at which reflected waves will travel in subsurface strata, it is necessary to consider the velocity of their transmission through the unconsolidated, weathered, sedimentary surface of the earth.

The usual procedure when the exploration of an area is begun is to develop these velocities in the different strata by what is termed a "velocity program" which entails recording records of seismic waves which will give directly the velocities in these particular strata. After having once ascertained these velocities, they can be used throughout the area in computing the depth of the particular reflecting strata. Due to the fact that the weathered surface layer of the earth varies in thickness, it is necessary that the thickness of this weathered layer be computed for each spread or location of geophones. To obtain the data from which the thickness of the weathered layer is computed, charges of explosives are detonated at the selected shot points and the velocity of the wave travel through the weathered or surface layer is determined. Due to the fact that the wave in which we are first interested travels substantially in a direct route to the detector, there is very little absorption present and an impulse of greater amplitude is recorded. It is necessary that the gain in amplification of a vacuum tube amplifier be at the maximum in order that the break in the seismogram trace, resulting from the arrival at the geophone of the first impulse of energy, be very definite. As a consequence heretofore, it has been necessary to record these data on a separate seismogram from that on which reflected waves are recorded. Such a procedure would necessitate recording a plurality of seismograms to obtain the data in the weathered layer and records of the reflected waves from shallow subsurface strata. Since the high cost of field operations makes the time factor of paramount importance, it is desirable to record all of these data on a single record from the detonation of a single charge of explosives. Such a procedure would result in a tremendous saving in the amount of explosives required and in the time required by the field party to record the data necessary on a single spread, as well as the time required for an interpreter to observe the data on a plurality of seismograms.

With previous methods of recording these data by the use of a plurality of charges of explosives, from which seismic waves have been recorded on a corresponding number of seismograms, it has been almost impossible to duplicate the conditions under which each charge of explosive is detonated, due to several factors, the most important of which are the changes in the conditions affecting the medium in which the shot is planted. When one charge of explosives is detonated in the bottom of a shot hole, a pocket or cavity is formed in some formations, while in others the bottom of the hole is filled up, due to the fact that the medium forming the walls of the cavity is of loosely packed material. This sometimes results in a loss of as much as 10' in the depth of the hole, and, in extreme cases, where the bottom of the hole is in a quicksand material, as much as 20' or 30' of the hole are lost by the detonation of a single charge in it. Such changes in conditions under which successive charges of explosives are detonated introduce variable factors in the apparent velocities of the recorded waves. These variable factors would make profiles computed from these data in error.

Therefore, the primary object of this invention is the provision of a method and apparatus whereby all the data that is required to be recorded on a particular spread when shot from one direction can be recorded on a single seismogram.

Another object of this invention is in the provision of a method and apparatus for controlling the gain in amplification to effect a definite recording of first impulses and reflected waves from shallow as well as deep horizons.

Still another object of this invention is in the provision of means whereby the vacuum tube amplifier is allowed to remain at or near its maximum sensitivity until the first impulses of the direct traveling waves have been recorded; then suppressing the gain in amplification.

This invention also contemplates the provision of means which will operate on either the control or suppressor grid of a conventional vacuum tube in one or more stages of the conventional amplifier to effect the above mentioned results.

Another object of the invention is the provision of a unit for effecting these results which can be utilized with a conventional amplifier.

Still another object of this invention resides in the provision of a complete electric seismograph having incorporated therein means for automatically controlling the amplitude of the signals recorded thereby. This invention further contemplates an automatic volume control for electric seismographs the initiation of the operation of which is delayed for a period of time; which would permit the recording with constant volume of the complete envelope of a reflection.

Another object of this invention is the provision of means dependent upon the amplitude of the detected seismic waves for automatically varying the grid bias potential on the suppressor or control grids of one or more vacuum tubes in an electric seismograph amplifier.

Still another object of this invention is the provision of automatic volume control means for electric seismograph amplifiers the operation of which can be initiated by signals taken from the plate circuits of any one of the vacuum tubes in the amplifier or from signals taken off by means of tertiary windings in the amplifier input or amplifier output transformers.

Other objects and advantages will become apparent from the following detailed descriptions, when considered with the attached drawings, in which:

Figure 1 is a composite diagram of the electric circuit of a seismograph utilizing the automatic volume control forming the subject matter of this application;

Figure 2 is a detailed circuit drawing of the output stage of the vacuum tube amplifier showing the manner in which the signal which initiates the operation of the automatic volume control is taken from a tertiary winding on the output transformer;

Figure 3 is a detailed circuit drawing of an intermediate stage in the vacuum tube amplifier showing the manner in which the signal from the plate circuit of an intermediate stage can be used to initiate the operation of the automatic volume control;

Figure 4 is a detailed circuit diagram of the input stage of the vacuum tube amplifier showing the manner in which the signal from the plate circuit of the vacuum tube in the first stage can be used to initiate the operation of the automatic volume control;

Figure 5 is a detailed circuit diagram of the input to the vacuum tube amplifier showing the manner in which the signal which initiates the operation of the automatic volume control can be taken from a tertiary winding on the input transformer;

Figure 6 is a reproduction of a seismogram that has been recorded in the conventional manner, that is, without any means for automatically controlling the volume; and Figure 7 is a reproduction of a seismogram which has been recorded while using the automatic volume control forming the subject matter of this application.

Referring to the drawings in detail, particularly Figure 1, there is shown a complete wiring diagram for an electric seismograph having incorporated therein the automatic volume control. A geophone 1 of conventional design, is placed on or near the surface of the earth in the conventional manner and is adapted to be actuated by seismic waves such as those generated by the detonation of a charge of explosive. Electric signals generated in this geophone by the movement of the earth are transmitted by means of the conductors 2 and 3 to the input winding of a transformer $T_1$; the output signal from the transformer $T_1$ is impressed upon the control grid of the vacuum tube 4, which amplifies the signal in the conventional manner. The output signal from this vacuum tube is amplified in successive steps by the vacuum tubes 5 and 6. These vacuum tubes are connected in the circuit of a resistance coupled amplifier. The output signal from the transformer $T_2$ is conducted to a recording galvanometer 7 by means of the conductors 8, 9, 10 and 11 where they are recorded on a moving sensitized paper or photographic film in the form of a seismogram. Timing indications are recorded on the sensitized paper or photographic film simultaneously with the signals from the amplifier. These time indications can be produced in any known conventional manner, such as for example, by a fork amplifier shown diagrammatically at 12.

The seismic waves which are detected by the geophone 1 are created by the detonation of an explosive by means of a conventional blaster which has been equipped with means for conducting a signal that is indicative of the instant of detonation to the recording galvanometer where it is recorded on the moving sensitized paper or photographic film. The shot end of the blaster and communicating circuit 13, whose details form no part of the present invention, need not be discussed. The recording end of the blaster and communicating circuit 14 are also of conventional design and need not be described in detail in this application.

Since it is desirous to record initial breaks resulting from direct traveling waves with maximum amplitude and still record reflections from shallow as well as deep horizons that subsequently arrive at the geophone with substantially constant amplitude, it is necessary that some means be provided whereby the gain in amplification as derived from the amplifier can be controlled in a predetermined manner. This is accomplished as shown in Figure 1 by taking the signal from the plate circuit of tube 6, that is impressed upon the primary winding of the output transformer $T_2$ and impressing this signal on the control grid of a vacuum tube 15. The tube 15, having been biased to a point near the point of cutoff, will rectify this signal and produce a flow of current in the plate circuit proportional to the signal impressed upon the control grid. The current flowing in the plate circuit of tube 15 will produce a voltage drop in the resistance $R_1$ which can be considered as the charging potential of condenser $C_1$. The resistance $R_1$ and the condenser $C_1$ and the series combination of resistance $R_2$ and condenser $C_2$ are connected in parallel relationship and since the resistance $R_2$ is as compared to $R_1$ relatively high and the capacity of condenser $C_1$ is relatively larger than that of condenser $C_2$, the condenser $C_1$ will become fully charged before appreciable current will flow through the branch circuit which includes the resistance $R_2$ and the condenser $C_2$. When condenser $C_1$ has become substantially charged, the condenser $C_2$ will begin to charge. By connecting the suppressor grid of vacuum tubes 4 and 5, through a de-coupling network 16, by means of conductor 17 to that end of resistance $R_2$ nearest condenser $C_2$, a varying grid bias that is controlled by the output of the amplifier can be placed on these two tubes to effect a control of the gain in amplification as derived from these two tubes. This obviously will effect the overall gain derived from the amplifier. The de-coupling network 16 comprises the resistances 16a and 16b, condensers 16c and 16d, the ground connection 16e, and the leads 16f and 16g, that connect the network to the suppressor grids of tubes 4 and 5 respectively. Lead 17 is connected to the network at 17a between the resistances 16a and 16b and serves as a conductor by means of which the control potential is supplied through the network 16 to the suppressor grids of tubes 4 and 5. It has been found that in operation the resistances 16a and 16b should be equal and approximately 100,000 ohms and the capacities of the condensers 0.1 mfd. each.

The network 16 serves as a decoupling network to prevent the feeding of input signal energy from tube 4 to tube 5 by way of the suppressor grid connections and at the same time provides means whereby the gain derived from the tubes 4 and 5 can be controlled by a single master control. The values of the resistances and capacitances have been so selected that there is little or no time delay in the voltage control action caused by this resistance-capacitance network.

The resistance $R_1$ is made low as compared to $R_2$ and the capacity of the condenser $C_1$ is made high relative to the capacity of $C_2$ so that there will be an appreciable period of time elapse before any variation of the suppressor grid bias is effected. This delay in the variation of the suppressor grid bias on tubes 4 and 5 is effected by varying the relative values of these elements to provide ample time for a reflected signal to be recorded in its correct character before the gain in amplification as derived from the amplifier is changed. The elements are arranged in the manner described and shown in Figure 1 so that the charging or discharging time of condenser $C_2$ will control the period of time throughout which the gain in amplification is suppressed or expanded.

From the above description of the detailed automatic volume control circuit it will become apparent that strong signals taken from the output of the amplifier will produce a large flow of current in the plate circuit of the tube 15. There will result a large IR drop in the resistance $R_1$. This IR drop in the resistance $R_1$ will serve as a charging potential for the condenser $C_1$. After the condenser $C_1$ has become charged the condenser $C_2$ will receive its charge. At the same time the condenser $C_2$ is being charged the bias potential on the suppressor grids of tubes 4 and 5 will start changing in a negative direction to suppress the gain in amplification. On the other hand, when the gain in amplification has fallen to a predetermined value the weak signals taken from the output of the amplifier will cause a correspondingly weak current to flow in the plate circuit of tube 15 and resistance $R_1$ causing an IR drop in this resistance which will be less than the charged potential of condenser $C_1$. As a result condenser $C_1$ will discharge through resistance $R_1$ until its charged potential is equal to the IR drop across the resistance $R_1$. Since the charged potential of condenser $C_2$ is equal to the charged potential of condenser $C_1$ less the IR drop in resistance $R_2$, condenser $C_2$ will also discharge until a balance is again established in the system. During the period of time when $C_2$ is discharging, the negative potential on the suppressor grids of tubes 4 and 5 will vary in a positive direction to effect an expansion of the gain in amplification.

In Figure 2 there is shown a slight modification of Figure 1 in that the signal which initiates the operation of the automatic volume control is taken from the terminal 18 of a tertiary winding of an output transformer $T_3$ in the amplifier.

Figure 3 shows still a further modification in that the signal may be taken off of the plate circuit of an intermediate stage of the amplifier such as at a point 19.

The detailed circuit in Figure 4 shows still another modification of the invention in that the signal which is used to control the gain in amplification may be taken from the plate circuit at a point 20 of the first tube in the vacuum tube amplifier.

As shown in Figure 5, a still further modification of the invention resides in that a tertiary winding may be used on the input transformer $T_4$ of the amplifier and the signal which controls the operation of the automatic volume control can be taken off at the terminal 21.

The operation of the automatic volume control will be the same in every instance. However, when using the input signal to the amplifier or those taken from the first stages of the amplifier, it may be necessary in some instances to pass them through one or more stages of amplification before introducing them to the control grid of vacuum tube 15. This will depend upon the range of sensitivity that is desired in the amplifier.

In Figure 6 there is illustrated a seismogram which has been recorded in the conventional manner, that is, without the use of any automatic volume control. It will be noted that the only useful information that can be taken from this seismogram is the instant of detonation 22 and the first break resulting from direct traveling waves 23. In Figure 7 there is shown a seismogram such as those recorded while using the automatic volume control. From this seismogram not only can the instant of detonation and the time of arrival of the direct traveling waves be determined, but data can be taken from the recorded signals representing shallow and deep reflections. The reflected wave energy recorded on the seismogram shown in Figure 7 at 24 from shallow as well as deep horizons is of substantially constant amplitude in every instance. It will be noted that not only does the automatic volume control permit the recording of the reflection with constant amplitude but it does in no way distort the character of the reflection.

Although the inventive subject matter of this application has been described in connection with varying the grid potential on the suppressor grids of two vacuum tubes in a conventional amplifier, it is obvious that results could be obtained by applying this varying potential to the suppressor grid of a single tube within the amplifier. To do this, however, would introduce distortion, as the varying grid bias would be reflected in the plate circuit of the tube. By applying this varying grid potential to two tubes simultaneously, the signals reflected in the plate circuits will cancel each other and eliminate the distortion. Additionally, the descriptive matter above has referred only to the use of the type of tube in an amplifier which has suppressor grids. It is obvious to those skilled in the art that this varying potential can be used on the control grids of ordinary triode tubes to effect a similar result.

I claim:

1. In an electric seismograph comprising means for detecting seismic waves by generating electrical signals in sympathy with them, thermionic means for amplifying said electrical signals, means for recording the amplified signals on a standard width strip in the form of a seismogram, an automatic volume control for said amplifier whose operation is initiated by the electrical signals, said automatic volume control comprising common thermionic means for both amplifying and rectifying the electrical signals, a resistance in the plate circuit of said thermionic means, energy storage means connected in parallel with said resistance whereby the IR drop across said resistance will serve as a charging voltage for said energy storage means, a second energy storage means connected in such relation to said first energy storage means that it will not receive any substantial energy until the first storage means has become substantially fully charged, and means for communicating the charged potential of the second energy storage means to the control grid of at least one vacuum tube in the thermionic amplifier to effect a control of the gain in amplification as derived from that tube.

2. In an electric seismograph comprising means for detecting seismic waves and generating electrical signals in sympathy with them, thermionic means for amplifying said electrical signals, means for recording the amplified signals on a standard width strip in the form of a seismogram, and an automatic volume control for said amplifier whose operation is initiated by the electrical signals passing through the amplifier, said automatic volume control comprising common means for both amplifying and rectifying a portion of the output electrical signals, a delay circuit adapted to be energized by the rectifying and amplifying means, a pair of energy storage devices connected in parallel in said delay circuit, one of said energy storage devices being adapted to store up energy received from the amplifying and rectifying means over a predetermined period of time that will become effective at the end of this predetermined period of time to charge the other energy storage device the potential of which will serve as a grid bias potential to control the gain in amplification as derived from at least one tube in the amplifier.

GOETHE M. GROENENDYKE.